US008607334B2

(12) United States Patent
Brown et al.

(10) Patent No.: US 8,607,334 B2
(45) Date of Patent: Dec. 10, 2013

(54) SYSTEM AND METHOD FOR SECURE MESSAGE PROCESSING

(75) Inventors: Michael K. Brown, Kitchener (CA);
Michael S. Brown, Waterloo (CA);
Michael G. Kirkup, Waterloo (CA);
Neil P. Adams, Waterloo (CA); Herbert A. Little, Waterloo (CA)

(73) Assignee: Research In Motion Limited (CA)

(*) Notice: Subject to any disclaimer, the term of this patent is extended or adjusted under 35 U.S.C. 154(b) by 1399 days.

(21) Appl. No.: 11/176,116

(22) Filed: Jul. 7, 2005

(65) Prior Publication Data

US 2006/0021038 A1     Jan. 26, 2006

Related U.S. Application Data

(60) Provisional application No. 60/586,423, filed on Jul. 8, 2004.

(51) Int. Cl.
*H04L 29/06*     (2006.01)

(52) U.S. Cl.
USPC .............................. 726/22; 709/207; 713/175

(58) Field of Classification Search
USPC ...................... 709/206, 207; 726/22; 713/175
See application file for complete search history.

(56) References Cited

U.S. PATENT DOCUMENTS

| 6,247,127 | B1* | 6/2001 | Vandergeest | 713/100 |
| 6,327,656 | B2* | 12/2001 | Zabetian | 713/176 |
| 7,010,683 | B2* | 3/2006 | Corella | 713/156 |
| 2002/0004902 | A1* | 1/2002 | Toh et al. | 713/170 |
| 2002/0007453 | A1* | 1/2002 | Nemovicher | 713/155 |
| 2002/0053023 | A1* | 5/2002 | Patterson et al. | 713/156 |
| 2002/0073310 | A1* | 6/2002 | Benantar | 713/156 |
| 2002/0169954 | A1* | 11/2002 | Bandini et al. | 713/153 |
| 2003/0172122 | A1* | 9/2003 | Little et al. | 709/207 |
| 2003/0217165 | A1* | 11/2003 | Buch et al. | 709/229 |
| 2004/0019643 | A1* | 1/2004 | Zirnstein, Jr. | 709/206 |
| 2004/0054887 | A1* | 3/2004 | Paulsen et al. | 713/154 |
| 2004/0064335 | A1* | 4/2004 | Yang | 705/1 |
| 2004/0073790 | A1* | 4/2004 | Ateniese et al. | 713/165 |
| 2004/0205248 | A1* | 10/2004 | Little et al. | 709/246 |
| 2004/0250076 | A1* | 12/2004 | Kung | 713/175 |
| 2004/0260778 | A1* | 12/2004 | Banister et al. | 709/206 |
| 2005/0144239 | A1* | 6/2005 | Mattathil | 709/206 |

* cited by examiner

*Primary Examiner* — Joseph P. Hirl
*Assistant Examiner* — John B King
(74) *Attorney, Agent, or Firm* — Schwegman Lundberg Woessner P.A.

(57) ABSTRACT

Systems and methods for secure e-mail message processing. A device is configured to receive a secure electronic message. The message may then be processed to determine whether the sender's address provided in the message is indicative of the sender's address provided in a sender's security-related certificate. A message's recipient can be notified based upon the determination.

14 Claims, 8 Drawing Sheets

SYSTEM AND METHOD FOR SECURE MESSAGE PROCESSING

CROSS-REFERENCE TO RELATED APPLICATION

This application claims priority to and the benefit of commonly assigned U.S. Provisional Application having Ser. No. 60/586,423, filed on Jul. 8, 2004, entitled "SYSTEM AND METHOD FOR SECURE MESSAGE PROCESSING," which is hereby incorporated by reference in its entirety for all purposes.

TECHNICAL FIELD

This document relates generally to the field of communications, and in particular to a system and method for improving security of e-mail message processing.

BACKGROUND

With ever increasing reliance on electronic mail as a method of communication, there is a need for improving security and reliability of e-mail transmissions. To accomplish this task, various authentication and confidentiality techniques have been developed. Authentication is a procedure that allows communicating parties to verify that contents of a message have not been altered and that the source is authentic. In turn, confidentiality services provide protection of message content from release to unauthorized parties. When combined, the authentication and confidentiality services protect electronic transmissions from various passive security attacks, such as eavesdropping and traffic monitoring, as well as active attacks, such as impersonation and falsification of data.

One implementation of these security services is a Public Key Infrastructure (PKI), which employs an asymmetric encryption technique for encrypting documents and messages. In a PKI scheme, each user generates a pair of keys: a public key and a private key. The public key is placed in a public register, while the private key is kept private. To communicate, a message is encrypted with one of the keys, so that it can be decrypted only with the other key. To assure authenticity of public keys, PKI provides for a Certification Authority (CA), which is a trusted third party that is authorized to issue certificates consisting of a public key and an ID of the key owner. Thus, the authenticity of a public key can be checked by referring to the associated public-key certificate.

In general, the PGP and S/MIME techniques are quite effective in providing both the authentication and confidentiality to electronic message transmissions; there are, however, instances in which both security schemes can be compromised. In one example, a malicious third party may use a forged public key to impersonate another by sending messages signed with a forged digital signature. In another example, a third party may forge both the certificate and the pair of keys with credentials of another and send e-mail messages signed with a forged digital signature. The recipient of such a message may believe that the message is authentic because the key used to decrypt it will be validated by the certificate. There are other examples of impersonation and various e-mail security attacks that S/MIME, PGP and other asymmetric or symmetric security schemes fail to prevent.

DETAILED DESCRIPTION

Figure 1:
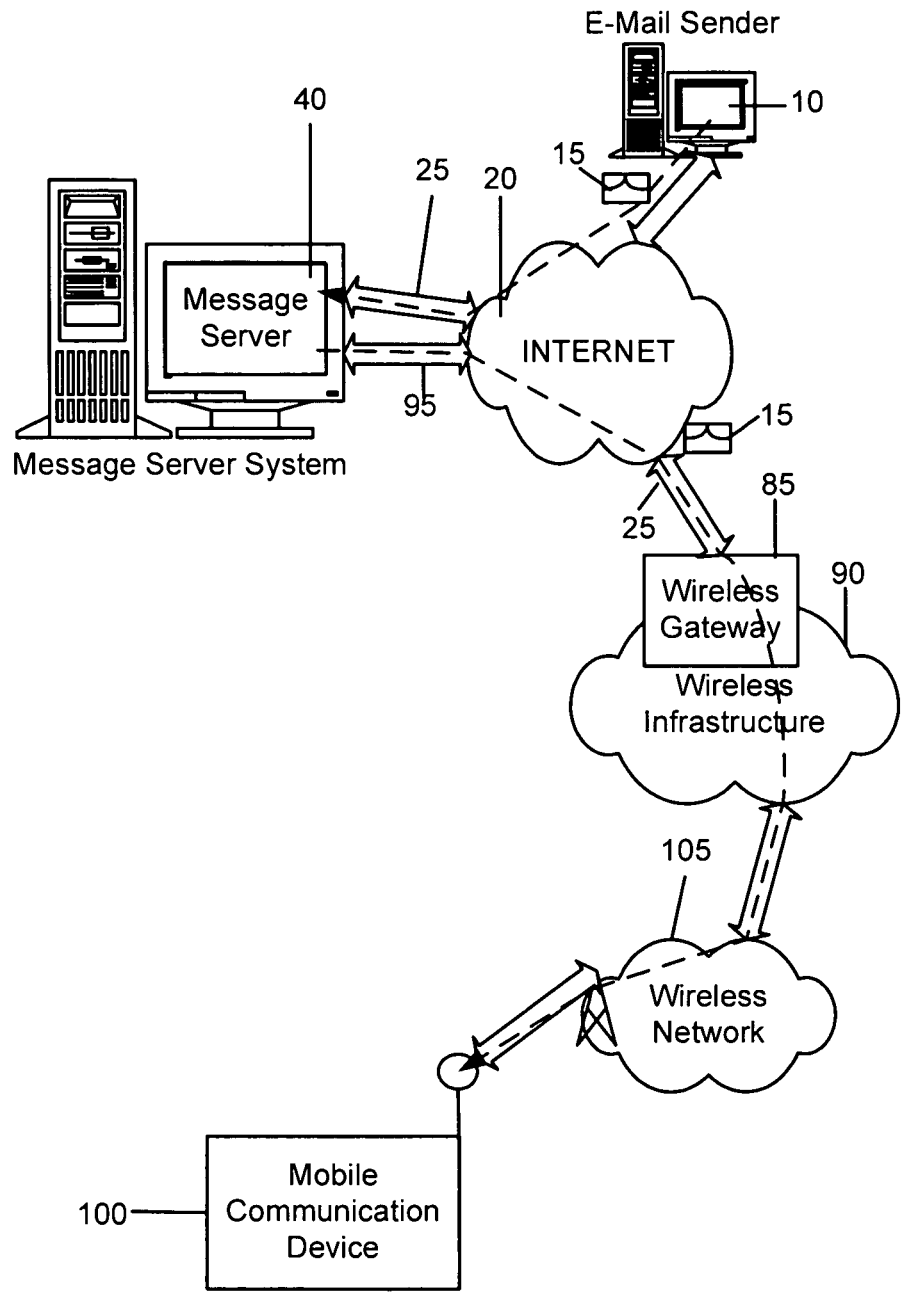
FIG. 1 is an overview of an exemplary communication system in which a wireless communication device may be used.

With reference to FIG. 1, an exemplary wireless communication environment is depicted which allows e-mail senders 10 to communicate with mobile devices 100 using Internet 20, a message server system 40, a wireless gateway 85, wireless infrastructure 90, and a wireless network 105. One skilled in the art will appreciate that there may be hundreds of different network topologies, but the system shown in FIG. 1 helps demonstrate the operation of the encoded message processing systems and methods described in the present application. It should also be understood by one skilled in the art that variations of the systems and methods of the present application can be implemented in a wired network environment as well. Accordingly, the system shown in FIG. 1 is for illustrative purposes only, and shows but one illustration of an Internet e-mail environment.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. The message may be transmitted using traditional Simple Mail Transfer Protocol (SMTP) and RFC822 headers. The message may also be secured using a Secure Multipurpose Internet Mail Extension (S/MIME) or a Pretty Good Privacy (PGP) security scheme. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In one example of the message processing system described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or Ti connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
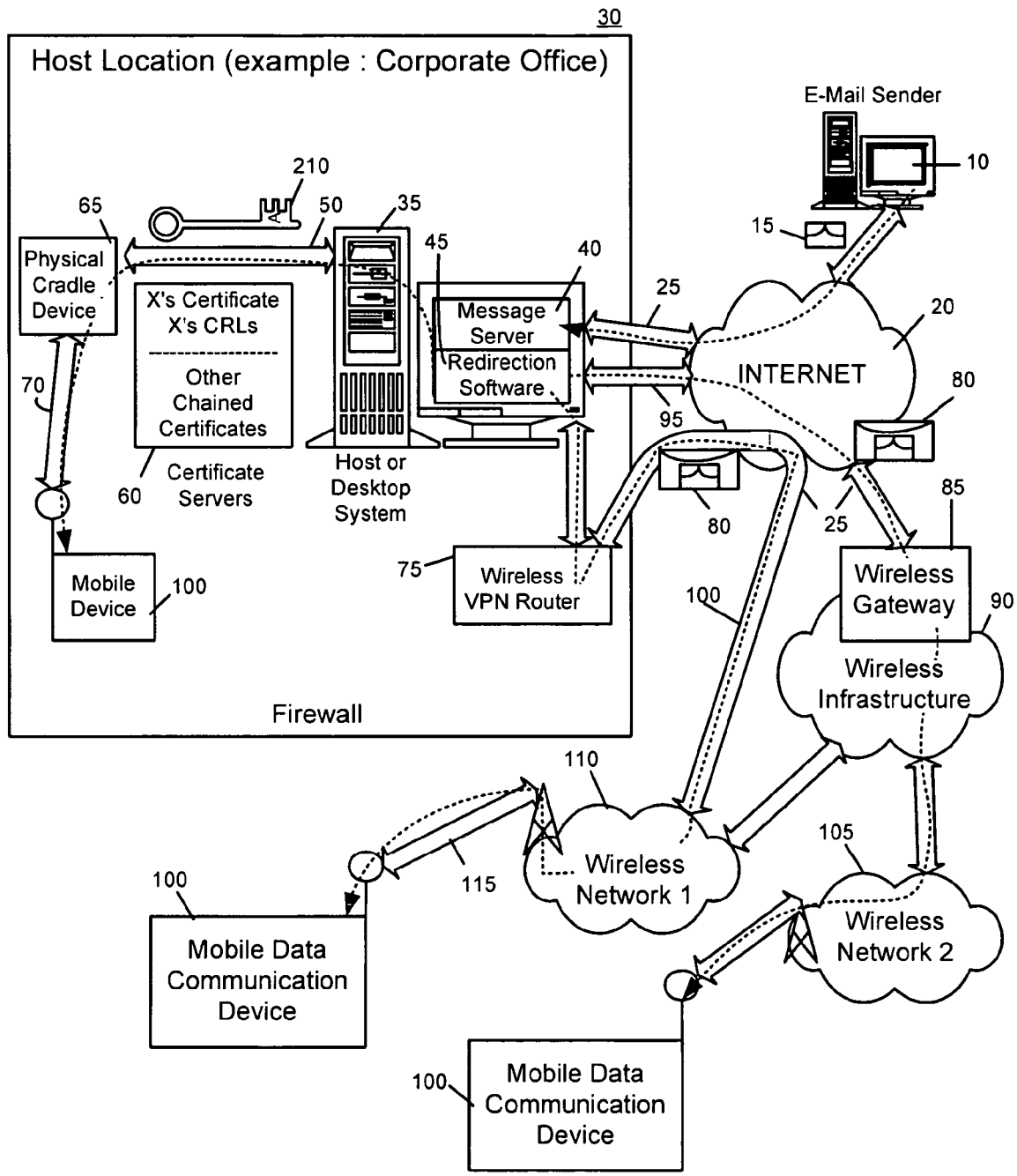
FIG. 2 is a block diagram of a further exemplary communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694, entitled "System and Method for Pushing Information From A Host System To A Mobile Data Communication Device Having A Shared Electronic Address," and issued to the assignee of the instant application on Apr. 17, 2001, which is incorporated herein by reference. This push technique may use a wireless friendly encoding, compression and encryption technique to deliver all information to a mobile device, thus effectively extending the security firewall to include each mobile device 100 associated with the host system 30.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

E-mail messages 15 exchanged between e-mail senders 10 and mobile devices 100 are often encrypted and signed using S/MIME, PGP or other synchronous or asynchronous security scheme. In one example, e-mail sender 10 may encrypt message 15 using recipient's public key, so that message may be decrypted only at the mobile device 100 using recipient's private key. E-mail sender 10 may also sign message 15 by applying a hashing function, e.g., SHA-1, to generate a hash code of the message. The hash code may then be encrypted with a PKI encryption algorithm, e.g., Triple DES, using the sender's private key, and the result is attached to the message 15 and sent over Internet 20 to mobile device 100. When received, the digital signature may be decrypted using sender's public key to recover message's hash code. The receiver may then generate a new hash code for the message and compare it with the decrypted hash code. If the two hashes match, the message may be accepted as authentic.

As shown above, to decrypt message 15, mobile device 100 acquires a sender's public key and determines whether this key is authentic. The information on the authenticity of the public key, as well as information about the public-key owner, can be typically obtained from a public-key certificate. The contents of the certificates are typically transmitted using the X.509 Distinguished Name (DN) syntax. The syntax provides a hierarchical structure for the content and defines a series of attributes that define the certificate holder:

| Attribute | Description | Example |
|---|---|---|
| C | Country name | C = United States |
| CN | Common name | CN = Jane Doe |
| E | E-mail address | E = jdoe@company.com |
| L | Location | L = San Francisco |
| O | Organization name | O = Company Corp. |
| OU | Organizational unit name | OU = Pixelvibe Division |
| ST | State or province | ST = California |

The information about private and public keys, certificates and Certificate Revocation Lists (CRLs) are typically stored on one or more certificate servers 60. Server 60 may reside on the LAN of central host system 30; alternatively, it may be remotely located and accessed via Internet 20. In one example, the certificate server 60 may be implemented as a Lightweight Directory Access Protocol (LDAP) server. The LDAP servers are typically configured to provide public-key certificates that can be used by mobile devices 100 to encrypt outgoing e-mail messages or to verify authenticity of incoming e-mail messages signed with senders' private keys. In another example, the certificate server 60 can be implemented as an Online Certificate Status Protocol (OCSP) server. The OCSP servers are typically configured to stores CRLs for various public-key certificates that can be used to determine certificate revocation status.

Since the LDAP and OCSP servers often support both the LAN-based and wireless certificate lookup, there are several ways in which these servers can be accessed. In one example, certificate-related information may be downloaded onto the mobile device 100 via serial port 50 of desktop system 35 when the device is docked in cradle 65. In this approach, the mobile device 100 can be configured to automatically decrypt the incoming e-mail messages and verify authenticity and status of public keys using CRLs stored in its memory. This serial link may also be used for other purposes, including setting up a private security key 210, e.g., S/MIME or PGP specific private key, which can be used by the desktop 35 and mobile device 100 to share one personality and one method for accessing mail.

In another example, certificate-related information may be wirelessly downloaded to the mobile device 100 in real-time when an e-mail message is received. This approach may be taken in two situations: first, when upon receipt of an e-mail signed with a sender's private key, a corresponding public key, or certificate thereof, is not available in the memory of the mobile device 100; and second, when a CRL stored in the memory of the wireless device 100, indicates that a particular public key, which is needed to decrypt received e-mail message, has expired. In these instances, mobile device 100 may be configured to automatically access the certificate server 60 to retrieve the required public key or to verify its status. The method entails mobile device 100 accessing certificate server 60 using LDAP and/or OCSP protocols over the wireless network 110.

Figure 3:
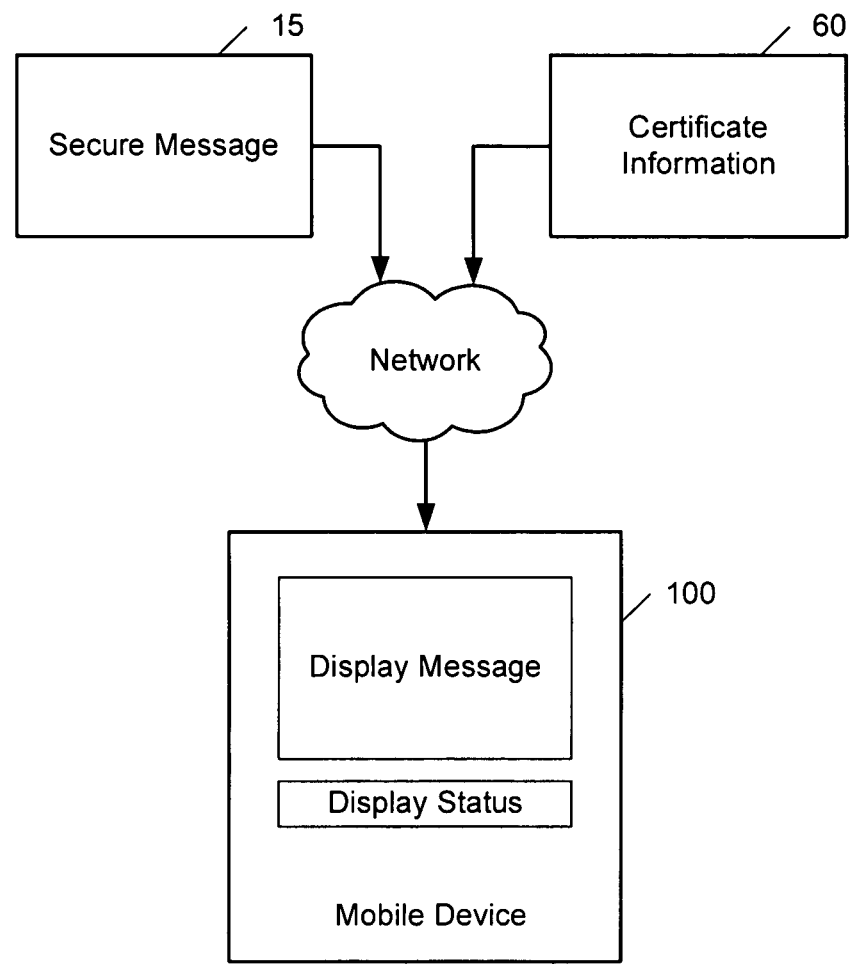
FIG. 3 is a block diagram illustrating one example of a message processing system.

As shown in FIG. 3, the user may query certificate server 60 based on the certificate holder's first name, last name, or e-mail address. Once found, the required public key and the corresponding certificate may be downloaded, stored and applied to decrypt and authenticate received e-mail messages before they are displayed to the recipient.

Figure 4:
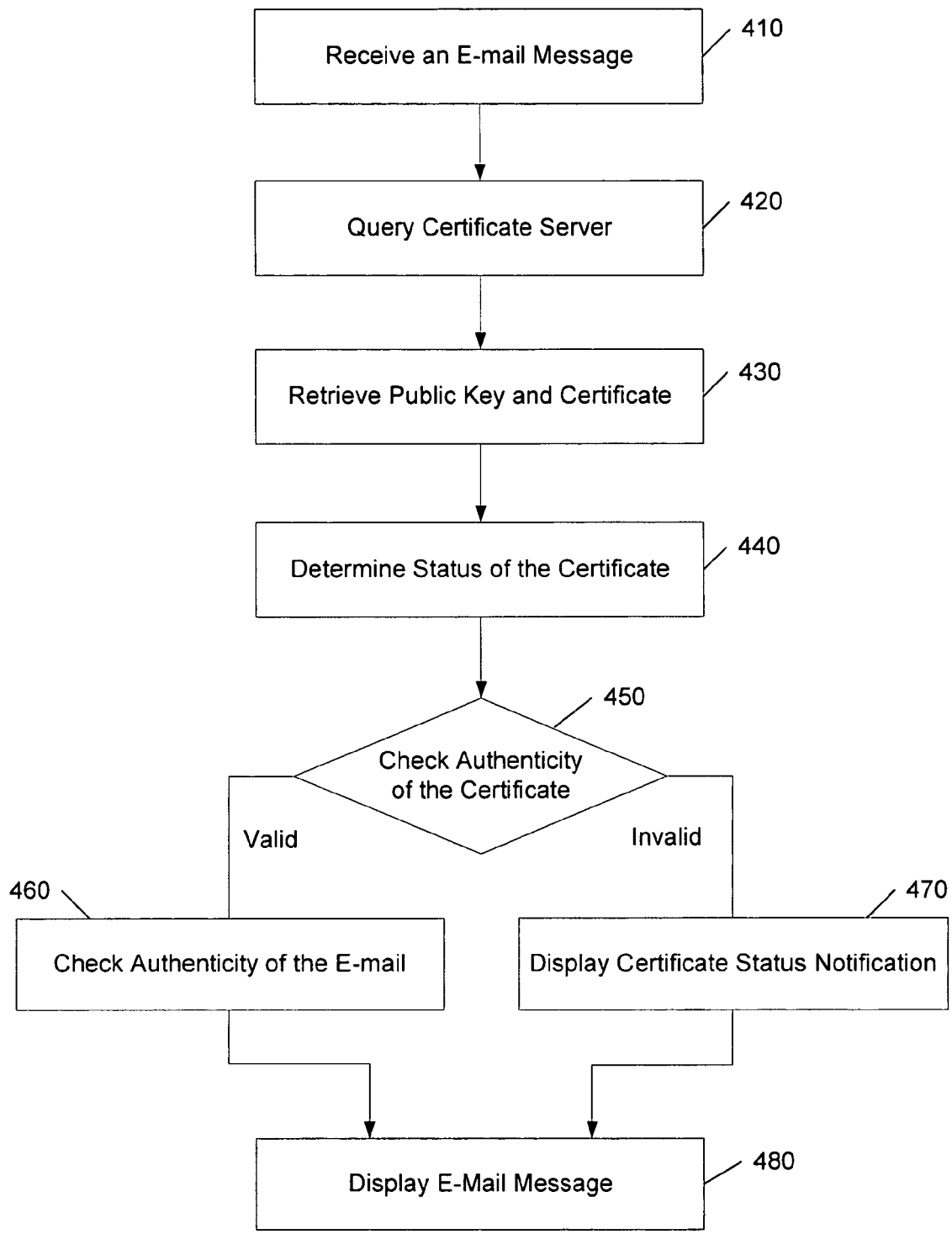
FIG. 4 is a flow chart diagram of an operational scenario for handling secure message processing.

This approach is described in more detail with reference to FIG. 4. In step 410, mobile device 100 receives e-mail message 15. The message may include a sender's signature, which may be a message hash that is encrypted with a sender's private key. Next, mobile device 100 may check its local memory to determine whether sender's public key is stored there. If not found, in step 420, certificate server 60 may be queried using one or more parameters from the message header, such as the sender's first or last name, to retrieve sender's public key and the corresponding certificate. The query may be implemented using LDAP and/or OCSP protocols over wireless network 110. In step 430, the requested public key and the corresponding certificate are transmitted to the message server 40.

Next, in step 440, mobile device 100 may determine the status of the certificate by checking its revocation status in the corresponding CRL. If the certificate is valid, in step 450; mobile device 100, may determine authenticity of the public key and the corresponding certificate. In particular, mobile device 100 may compare one or more parameters from the header of the received e-mail message 15 with one or more parameters in the public-key certificate retrieved from certificate server 60. In one example, sender's e-mail address in the header of e-mail message 15 may be compared with the certificate holder's e-mail address. A match between the two e-mail addresses indicates that e-mail message 15 came from the certificate holder's e-mail account. A mismatch, however, may indicate that the certificate is forged.

Next, in step 460, if the certificate was determined to be authentic, mobile device 100 can check the authenticity of the e-mail message 15. To accomplish this, in one example, a digital signature from the received message 15 may be extracted and decrypted using the retrieved public key. Once decrypted, a new hash code of message 15 may be generated and compared with the decrypted hash code; a match between the two hashes, is an indication that the message is authentic. Once the message authentication procedure is successfully completed, the message may be displayed to the message recipient in step 480.

Figure 7:
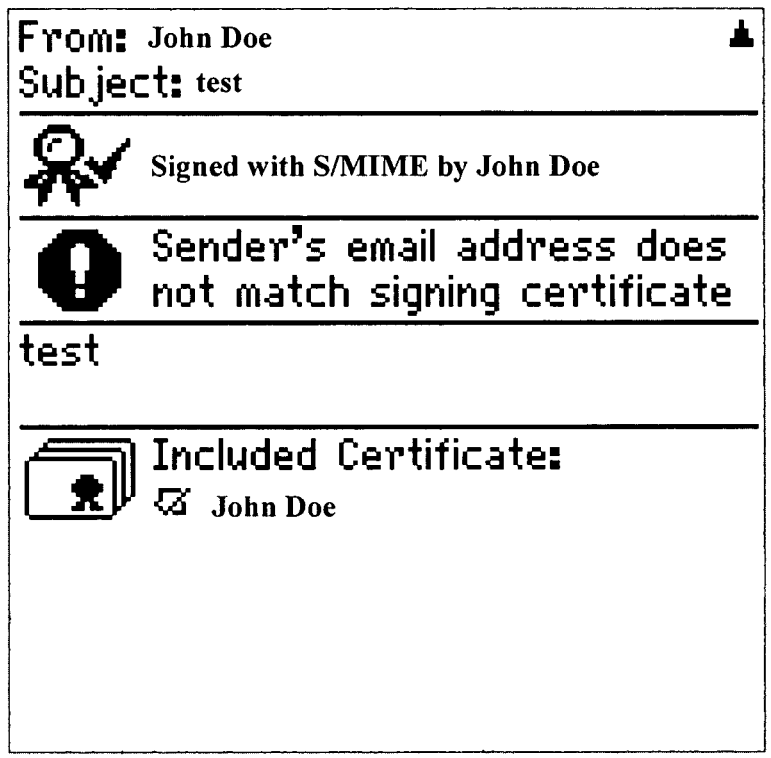
FIG. 7 is an exemplary user notification.

However, if in step 450, the certificate was determined to be invalid, e.g., sender's e-mail address in the message 15 differed from the e-mail address of the certificate holder, mobile device 100 may notify, in step 470, the recipient of the message of such a discrepancy. The notification may take several forms. In one example, a warning message may be displayed to the recipient. The notification may state as shown in FIG. 7: "Sender's e-mail address does not match signing certificate!" In another example, the recipient may be notified via a visual indication such as a warning icon. In yet another example, an audio warning may be played to the message recipient or a tactile indication may be generated, such as through a vibrating device. In addition, message recipient may be provided with a detailed information regarding the certificate. This information may include, sender's e-mail address indicated in the message, the certificate owner e-mail address, and the certificate owner first and last name.

Figure 5:
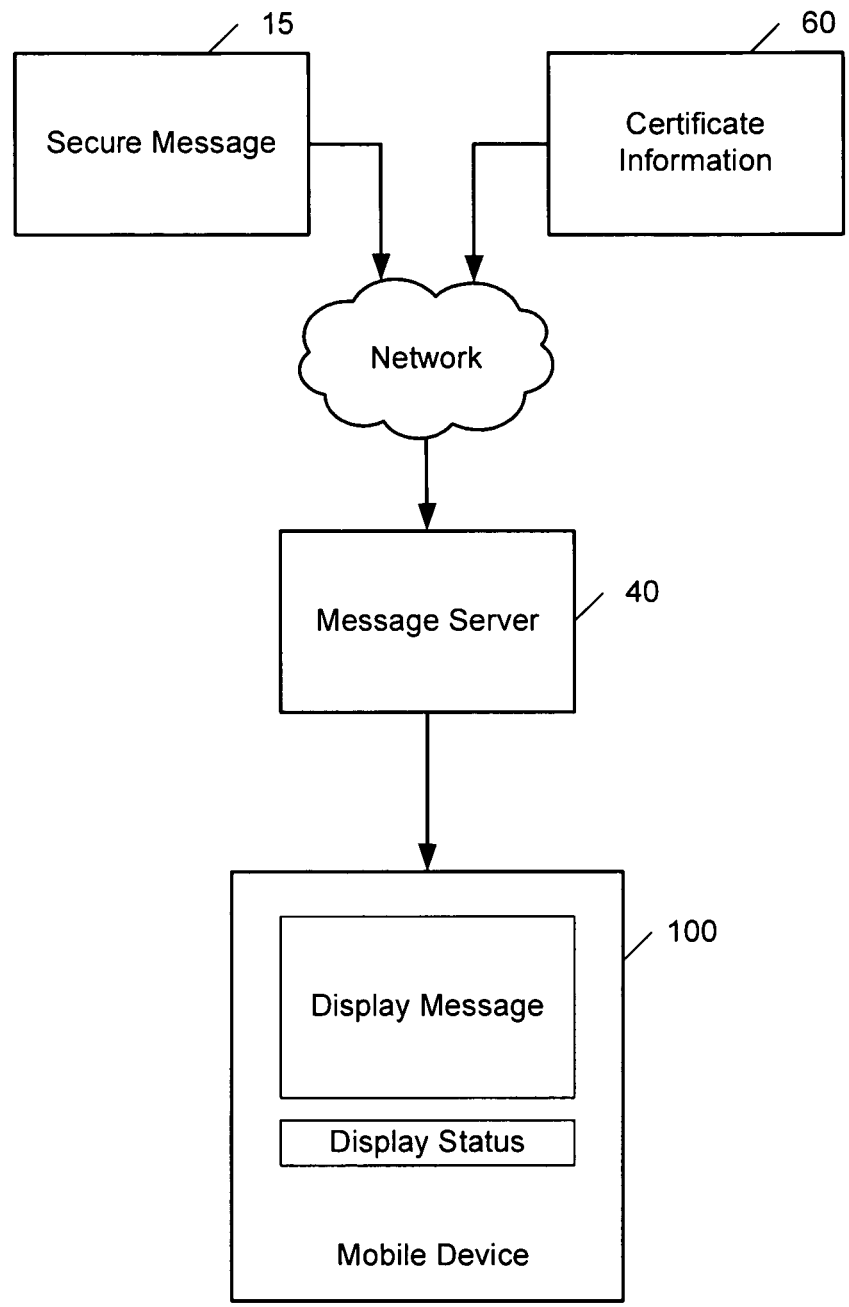
FIG. 5 is a block diagram illustrating another example of a message processing system.

In yet another example, message server 40 may be configured to authenticate e-mail messages 15 as they are being received from the e-mail sender 10 but before they are forwarded over wireless network 110 to mobile device 100 using, for example, redirection software 45. With reference to FIG. 5, message server 40 may be configured to access certificate servers 60 using LDAP and/or OCSP protocols via LAN of the host system 30, or via Internet 20 if servers 60 are remote, to retrieve necessary public keys and the corresponding public-key certificates. Furthermore, the message server 40 may be configured to determine whether the retrieved keys and the corresponding certificate are authentic and the intercepted message is not signed by a malicious third party with a forged private key.

Figure 6:
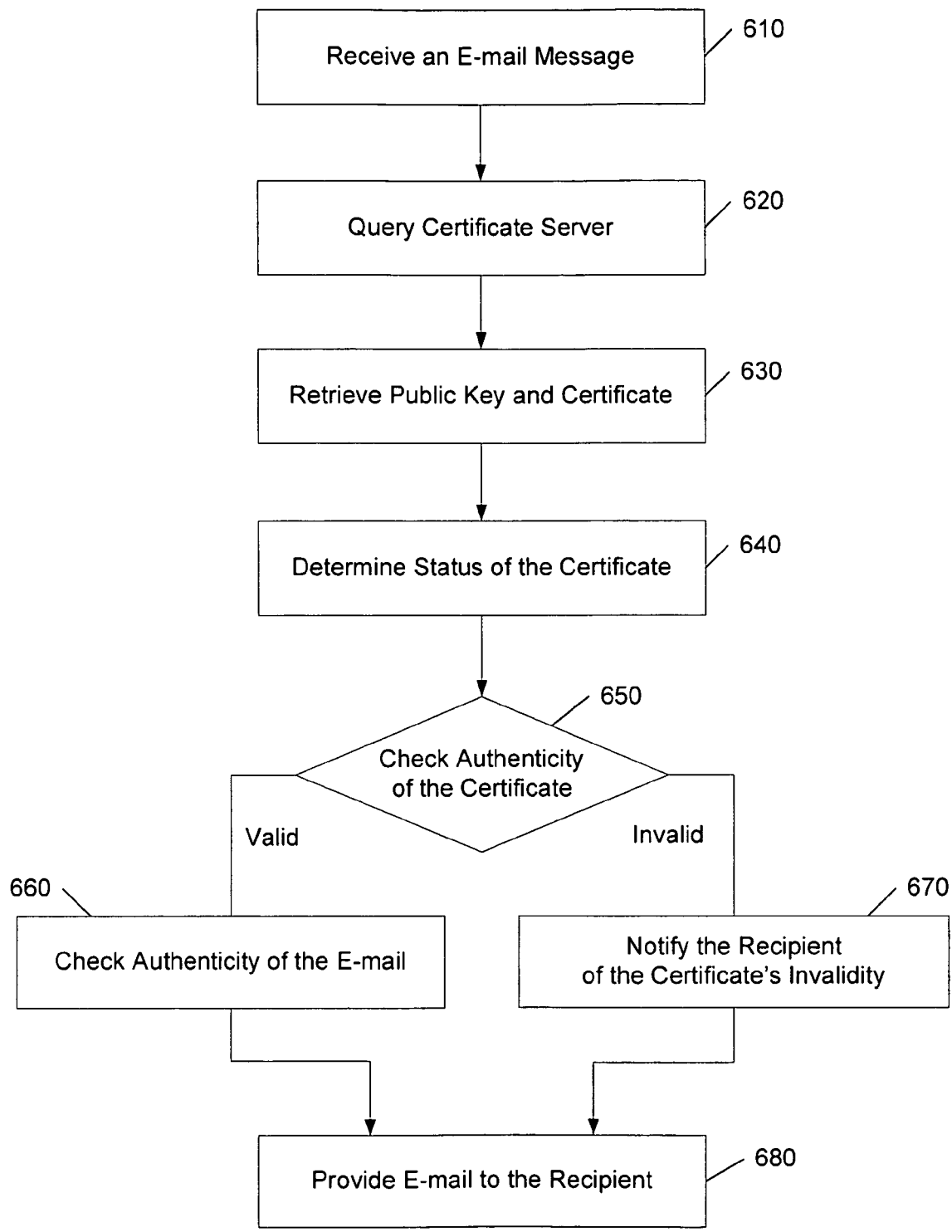
FIG. 6 is a flow chart diagram of an operational scenario using the exemplary communication system of FIG. 5.

This approach is described in more detail with reference to FIG. 6. In step 610, message server 40 receives e-mail message 15 addressed to mobile device 100. The message may include a sender's signature, which may be a message hash encrypted with sender's private key. Next, message server 40 may check its local memory to determine whether sender's public key is stored there. If not found, in step 620, certificate server 60 may be queried using one or more parameters from the message header, such as the sender's first or last name, to retrieve sender's public key and the corresponding certificate. The query may be implemented using LDAP and/or OCSP protocols. In step 630, the requested public key and the corresponding certificate are transmitted to the message server 40.

Next, in step 640, message server 40 may determine the status of the certificate by checking its revocation status in the corresponding CRL. If the certificate is valid, in step 650, message server 40 may proceed to determine authenticity of the public key and the corresponding certificate. In particular, message server 40 may compare one or more parameters from the header of the received e-mail message 15 with one or more parameters in the public-key certificate retrieved from certificate server 60. In one example, message server 40 may check sender's e-mail address in the header of the message 15 with the certificate holder's e-mail address. A match between the two e-mail addresses, indicates that the e-mail message 15 came from the certificate holder's e-mail account. A mismatch, however, may indicate that the certificate is forged.

Next, in step 660, if the certificate was determined to be authentic, message server 40 can check the authenticity of the e-mail message 15. To accomplish this, in one example, message server 40 may extract a signature from the received message 15 and decrypt it using the retrieved public key. Once decrypted, a new hash code of message 15 may be generated and compared with the decrypted hash code; a match between the two hashes is an indication that the received message 15 is authentic. Once the message authentication procedure is successfully completed, the message may be provided to the mobile device 100 in step 680.

However, if in step 650, the certificate was determined to be invalid, e.g., sender's e-mail address in the message 15 differed from the e-mail address of the certificate holder, message server 40 may notify, in step 670, the recipient of the message of such a discrepancy. The notification may take several forms. In one example, the message server 40 may send a warning message to the mobile device 100, to be displayed to the message recipient. The message may state as shown in FIG. 7: "Sender's e-mail address does not match signing certificate!" In another example, the recipient may be notified via a visual indication such as a warning icon. In yet another example, an audio warning may be played to the message recipient. The e-mail message itself may be stored on the message server 40 until the recipient requests to retrieve the message. Alternatively, as shown in step 680, e-mail message 15 may be redirected to the mobile device 100 along with the warning notification. In addition, message server 40 may provide the recipient with a detailed information regarding the certificate. This information may include, sender's e-mail addresses indicated in the message, the certificate owner e-mail address, and the certificate owner first and last name.

It should be understood that similar to the other processing flows described herein, the steps and the order of the steps in the flowcharts described herein may be altered, modified and/or augmented and still achieve the desired outcome. For example, the above-described message authentication processes may be distributed between the message server 60 and mobile device 100.

The systems and methods disclosed herein are presented only by way of example and are not meant to limit the scope of the invention. Other variations of the systems and methods described above will be apparent to those skilled in the art. As an example of the wide variations, a method and system for secure message processing may comprise receiving a secure electronic message, determining whether the sender's address provided in the message is indicative of the sender's address provided in a sender's security-related certificate, and notifying the message's recipient based upon whether the sender's address provided in the message is indicative of the sender's address provided in the certificate. The sender's security-related certificate may be the sender's public-key certificate. Furthermore, the electronic message may be secured using, for example, S/MIME, PGP or other types of symmetric or asymmetric security schemes.

As another example, a method for secure message processing may comprise receiving an electronic message having a digital signature thereof attached thereto, wherein the digital signature is encrypted with a sender's private key, determining whether the sender's address in the electronic message is indicative of the sender's address in the sender's public-key certificate, and notifying the recipient of the electronic message if the addresses do not match.

As yet another example, methods and systems can be configured for secure message processing. A secure message can be received, and a sender's security-related information can be retrieved from one or more of a local memory medium. There can be a determination as to whether the sender's address provided in the message is indicative of the sender's address provided in the retrieved sender's security-related information. The message recipient can be notified based upon whether the sender's address provided in the message is indicative of the sender's address provided in the retrieved sender's-related information.

There are many ways in which a method processing system may be implemented. As one illustration, messages may be received by a message server, which may be configured to authenticate the received messages and to notify the message recipient of the message status. In another example, messages may be authenticated directly by the recipient, without assistance of the message server. Message authentication may be conducted by the recipient's computer system, which may be a personal computer, a laptop computer, a personal communication device or any other type of computer system that is capable of receiving and processing electronic mail. In yet another example, the message authentication process may be distributed between the message server and the recipient's computer system.

In various examples of systems for secure electronic message processing, the security information, including sender's public key and the corresponding certificates may be stored in the memory of a message server. In another example, this information may be stored in a memory of a recipient's computer system. In yet another example, this information may be stored on a certificate server, which may be local to or remote from the message server and/or recipient's computer system. The certificate information may be retrieved from the certificate server using, for example, LDAP and OCSP protocols and the like.

The message status notification may also take different forms. In one example, the notification may be a visual indication provided with the display of the electronic message to the recipient. In other examples, the notification may be a warning icon that is displayed to the message recipient. In yet another example, an audio warning may be played to the message recipient. In another example, detailed information regarding whether the addresses match may be provided to the message recipient if the recipient activates a visual indication. Such detailed information may include the sender's address in the electronic message, the sender's address in the public-key certificate, and the certificate's holder first and last name.

As another example of the wide variations for the systems and methods disclosed herein, the systems and methods may be provided on many different types of computer-readable media including storage mechanisms (e.g., CD-ROM, diskette, RAM, flash memory, etc.) that contain instructions for use in execution by a processor to perform the methods' operations and implement the systems described herein. As a non-limiting example of a system and method described here, a system and method can include a method for secure message processing may comprise receiving a secure electronic message, determining whether the sender's address provided in the message is indicative of the sender's address provided in a sender's security-related certificate, and notifying the message's recipient based upon whether the sender's address provided in the message is indicative of the sender's address provided in the certificate. The sender's security-related certificate may be the sender's public-key certificate. Furthermore, the electronic message may be secured using, for example, S/MIME, PGP or other types of symmetric or asymmetric security schemes.

In another example, a system and method for secure message processing may comprise receiving an electronic message having a digital signature thereof attached thereto, wherein the digital signature is encrypted with a sender's private key, determining whether the sender's address in the electronic message is indicative of the sender's address in the sender's public-key certificate, and notifying the recipient of the electronic message if the addresses do not match.

There are several ways in which a system and method may be implemented. In one example, messages may be received by a message server, which may be configured to authenticate the received messages and to notify the message recipient of the message status. In another example, messages may be authenticated directly by the recipient, without assistance of the message server. Message authentication may be conducted by the recipient's computer system, which may be a personal computer, a laptop computer, a personal communication device or any other type of computer system that is capable of receiving and processing electronic mail. In yet another example, the message authentication process may be distributed between the message server and the recipient's computer system.

In various examples of secure electronic message processing, the security information, including sender's public key and the corresponding certificates may be stored in the memory of the message server. In another example, this information may be stored in a memory of a recipient's computer system. In yet another example, this information may be stored on a certificate server, which may be local to or remote from the message server and/or recipient's computer system. The certificate information may be retrieved from the certificate server using, for example, LDAP and OCSP protocols and the like.

The message status notification may also take different forms. In one example, the notification may be a visual indication provided with the display of the electronic message to the recipient. In other examples, the notification may be a warning icon that is displayed to the message recipient. In yet another example, an audio warning may be played to the message recipient. In another example, detailed information regarding whether the addresses match may be provided to the message recipient if the recipient activates a visual indication. Such detailed information may include the sender's address in the electronic message, the sender's address in the public-key certificate, and the certificate's holder first and last name.

The systems' and methods' data may be stored as one or more data structures in memory and/or storage depending upon the application at hand. The data structure disclosed herein describe formats for use in organizing and storing data in memory or other computer-readable media for use by a program. It is further noted that the systems and methods may be implemented on various types of architectures, and data signals to/from a device may be conveyed via fiber optic medium, carrier waves, wireless networks, etc. for communication with devices.

The components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a script language, or as another type of code.

As another illustration, a system can be configured to detect e-mail impersonation attacks, in which a malicious third party uses a forged pair of keys and a certificate to impersonate another by sending e-mail messages signed with a forged digital signature. Without assistance of the above-described e-mail processing systems, the recipient of such a message may be prone to believe that the message is authentic because the public key used in decrypting the message will match corresponding certificate.

Figure 8:
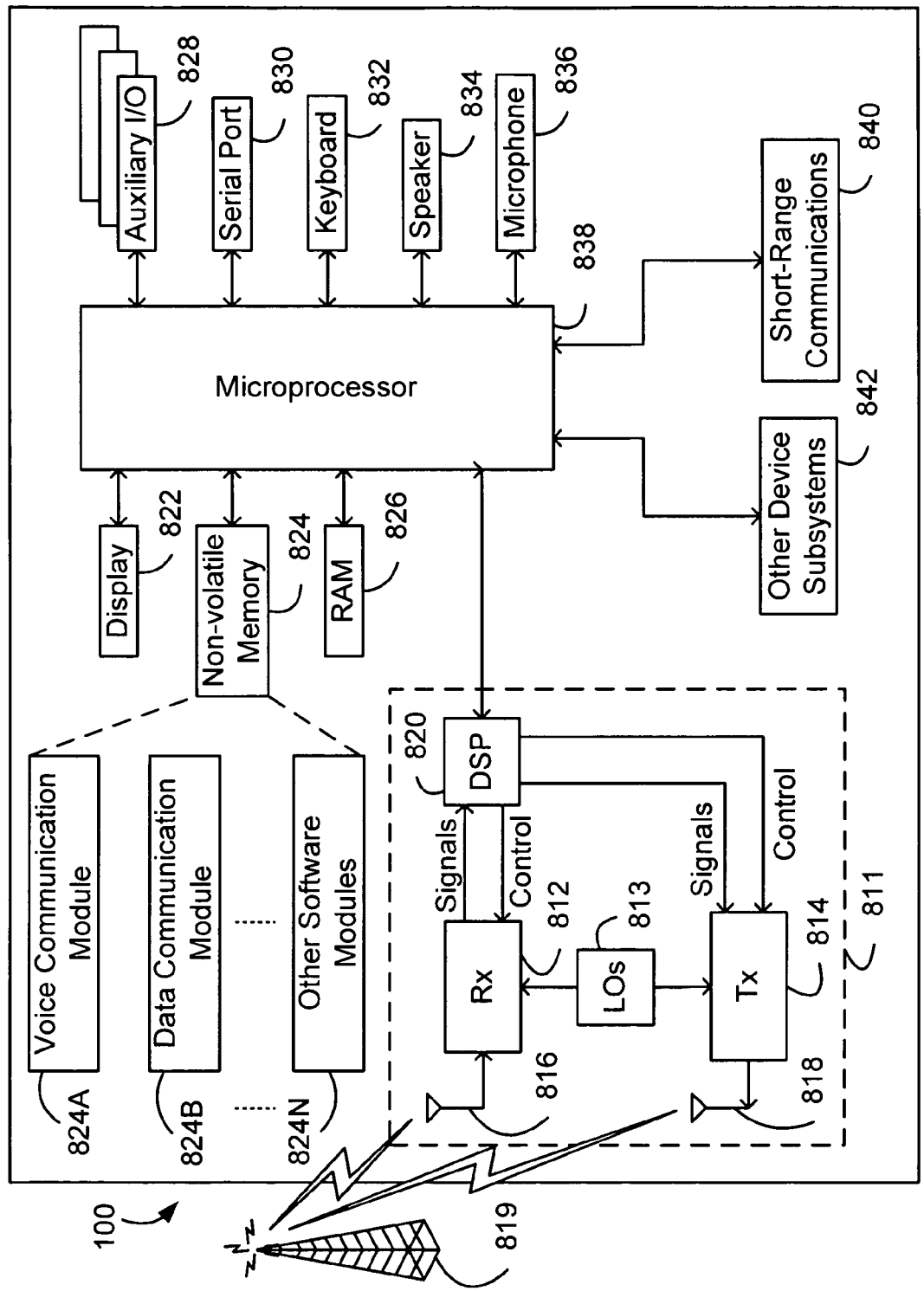
FIG. 8 is a block diagram of an exemplary mobile communication device.

As another example, the systems and methods disclosed herein may be used with many different computers and devices, such as a wireless mobile communications device shown in FIG. 8. With reference to FIG. 8, the mobile device 100 is a dual-mode mobile device and includes a transceiver 811, a microprocessor 838, a display 822, non-volatile memory 824, random access memory (RAM) 826, one or more auxiliary input/output (I/O) devices 828, a serial port 830, a keyboard 832, a speaker 834, a microphone 836, a short-range wireless communications sub-system 840, and other device sub-systems 842.

The transceiver 811 includes a receiver 812, a transmitter 814, antennas 816 and 818, one or more local oscillators 813, and a digital signal processor (DSP) 820. The antennas 816 and 818 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 8 by the communication tower 819. These voice and data networks may be separate communication networks using separate infrastructure, such as base stations, network controllers, etc., or they may be integrated into a single wireless network.

The transceiver 811 is used to communicate with the network 819, and includes the receiver 812, the transmitter 814, the one or more local oscillators 813 and the DSP 820. The DSP 820 is used to send and receive signals to and from the transceivers 816 and 818, and also provides control information to the receiver 812 and the transmitter 814. If the voice and data communications occur at a single frequency, or closely-spaced sets of frequencies, then a single local oscillator 813 may be used in conjunction with the receiver 812 and the transmitter 814. Alternatively, if different frequencies are utilized for voice communications versus data communications for example, then a plurality of local oscillators 813 can be used to generate a plurality of frequencies corresponding to the voice and data networks 819. Information, which includes both voice and data information, is communicated to and from the transceiver 811 via a link between the DSP 820 and the microprocessor 838.

The detailed design of the transceiver 811, such as frequency band, component selection, power level, etc., will be dependent upon the communication network 819 in which the mobile device 100 is intended to operate. For example, a mobile device 100 intended to operate in a North American market may include a transceiver 811 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 819, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 819, other than any legally required operations, such as '911' emergency calling.

After any required network registration or activation procedures have been completed, the mobile device 100 may then send and receive communication signals, including both voice and data signals, over the networks 819. Signals received by the antenna 816 from the communication network 819 are routed to the receiver 812, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 820. In a similar manner, signals to be transmitted to the network 819 are processed, including modulation and encoding, for example, by the DSP 820 and are then provided to the transmitter 814 for digital to analog conversion, frequency up conversion, filtering, amplification and transmission to the communication network 819 via the antenna 818.

In addition to processing the communication signals, the DSP 820 also provides for transceiver control. For example, the gain levels applied to communication signals in the receiver 812 and the transmitter 814 may be adaptively controlled through automatic gain control algorithms implemented in the DSP 820. Other transceiver control algorithms could also be implemented in the DSP 820 in order to provide more sophisticated control of the transceiver 811.

The microprocessor 838 preferably manages and controls the overall operation of the mobile device 100. Many types of microprocessors or microcontrollers could be used here, or, alternatively, a single DSP 820 could be used to carry out the functions of the microprocessor 838. Low-level communication functions, including at least data and voice communications, are performed through the DSP 820 in the transceiver 811. Other, high-level communication applications, such as a voice communication application 824A, and a data communication application 824B may be stored in the non-volatile memory 824 for execution by the microprocessor 838. For example, the voice communication module 824A may provide a high-level user interface operable to transmit and receive voice calls between the mobile device 100 and a plurality of other voice or dual-mode devices via the network 819. Similarly, the data communication module 824B may provide a high-level user interface operable for sending and receiving data, such as e-mail messages, files, organizer information, short text messages, etc., between the mobile device 100 and a plurality of other data devices via the networks 819. The microprocessor 838 also interacts with other device subsystems, such as the display 822, the RAM 826, the auxiliary input/output (I/O) subsystems 828, the serial port 830, the keyboard 832, the speaker 834, the microphone 836, the short-range communications subsystem 840 and any other device subsystems generally designated as 842.

Some of the subsystems shown in FIG. 8 perform communication-related functions, whereas other subsystems may provide "resident" or on-device functions. Notably, some subsystems, such as the keyboard 832 and the display 822 may be used for both communication-related functions, such as entering a text message for transmission over a data communication network, and device-resident functions such as a calculator or task list or other PDA type functions.

Operating system software used by the microprocessor 838 is preferably stored in a persistent store such as non-volatile memory 824. The non-volatile memory 824 may be implemented, for example, as a Flash memory component, or as battery backed-up RAM. In addition to the operating system, which controls low-level functions of the mobile device 810, the non-volatile memory 824 includes a plurality of software modules 824A-824N that can be executed by the microprocessor 838 (and/or the DSP 820), including a voice communication module 824A, a data communication module 824B, and a plurality of other operational modules 824N for carrying out a plurality of other functions. These modules are executed by the microprocessor 838 and provide a high-level interface between a user and the mobile device 100. This interface typically includes a graphical component provided through the display 822, and an input/output component provided through the auxiliary I/O 828, keyboard 832, speaker 834, and microphone 836. The operating system, specific device applications or modules, or parts thereof, may be temporarily loaded into a volatile store, such as RAM 826 for faster operation. Moreover, received communication signals may also be temporarily stored to RAM 826, before permanently writing them to a file system located in a persistent store such as the Flash memory 824.

An exemplary application module 824N that may be loaded onto the mobile device 100 is a personal information manager (PIM) application providing PDA functionality, such as calendar events, appointments, and task items. This module 824N may also interact with the voice communication module 824A for managing phone calls, voice mails, etc., and may also interact with the data communication module for managing e-mail communications and other data transmissions. Alternatively, all of the functionality of the voice communication module 824A and the data communication module 824B may be integrated into the PIM module.

The non-volatile memory 824 preferably also provides a file system to facilitate storage of PIM data items on the device. The PIM application preferably includes the ability to send and receive data items, either by itself, or in conjunction with the voice and data communication modules 824A, 824B, via the wireless networks 819. The PIM data items are preferably seamlessly integrated, synchronized and updated, via the wireless networks 819, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 826. Such information may instead be stored in the non-volatile memory 824, for example, when storage intervals are relatively short, such that the information is removed from memory soon after it is stored. However, storage of this information in the RAM 826 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 830 of the mobile device 100 to the serial port of a computer system or device. The serial port 830 may also be used to enable a user to set preferences through an external device or software application, or to download other application modules 824N for installation. This wired download path may be used to load an encryption key onto the device, which is a more secure method than exchanging encryption information via the wireless network 819. Interfaces for other wired download paths may be provided in the mobile device 100, in addition to or instead of the serial port 830. For example, a USB port would provide an interface to a similarly equipped personal computer.

Additional application modules 824N may be loaded onto the mobile device 100 through the networks 819, through an auxiliary I/O subsystem 828, through the serial port 830, through the short-range communications subsystem 840, or through any other suitable subsystem 842, and installed by a user in the non-volatile memory 824 or RAM 826. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 811 and provided to the microprocessor 838, which preferably further processes the received signal in multiple stages as described above, for eventual output to the display 822, or, alternatively, to an auxiliary I/O device 828. A user of mobile device 100 may also compose data items, such as e-mail messages, using the keyboard 832, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 828, which may include a thumbwheel input device, a touchpad, a variety of switches, a rocker input switch, etc. The composed data items input by the user may then be transmitted over the communication networks 819 via the transceiver module 811.

When the mobile device 100 is operating in a voice communication mode, the overall operation of the mobile device is substantially similar to the data mode, except that received signals are preferably be output to the speaker 834 and voice signals for transmission are generated by a microphone 836. Alternative voice or audio I/O subsystems, such as a voice message recording subsystem, may also be implemented on the mobile device 100. Although voice or audio signal output is preferably accomplished primarily through the speaker 834, the display 822 may also be used to provide an indication of the identity of a calling party, the duration of a voice call, or other voice call related information. For example, the microprocessor 838, in conjunction with the voice communication module and the operating system software, may detect the caller identification information of an incoming voice call and display it on the display 822.

A short-range communications subsystem 840 is also included in the mobile device 100. The subsystem 840 may include an infrared device and associated circuits and components, or a short-range RF communication module such as a Bluetooth module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

It is claimed:

1. A method for secure message processing by a communication device to identify an email impersonation attack, the method comprising:

receiving a secure electronic message from a sender, the secure electronic message including a header, contents, and a signature of the sender, the signature comprising a message hash encrypted with a private key of the sender, the header including a sender's address;

checking local memory of the communication device for a public key of the sender;

querying a certificate server over a wireless network to retrieve the public key when the public key was not found in the local memory and to retrieve a corresponding certificate, the querying including providing one or more parameters from the header of the secure electronic message to the certificate server to identify the sender, the certificate being a public key certificate;

authenticating the public key and the corresponding certificate by comparing the sender's address provided in the header of the secure electronic message with the sender's address provided in the certificate;

when the certificate is authenticated, checking the authenticity of the secure electronic message using the sender's public key and displaying the contents of the message when the secure electronic message is authenticated; and when the certificate fails to authenticate, providing a notification to a message recipient that the sender's address from in the secure electronic message does not match the sender's address provided in the sender's certificate indicating a possible email impersonation attack in which the sender may have used a forged public key.

2. The method of claim 1, wherein the notification is one or more visual, audio or tactile indications that are provided with display of the secure electronic message to the message recipient.

3. The method of claim 1, further comprising: providing the message recipient with information regarding whether the sender's address provided in the secure electronic message is indicative of the sender's address provided in the sender's certificate,
wherein the information is provided to the message recipient if a visual indication is activated on a message recipient device.

4. The method of claim 3, wherein the information comprises one or more of the following: a sender's address in the secure electronic message, a sender's address in the sender's certificate, or a sender's public-key certificate and a sender's name.

5. The method of claim 1, wherein the sender's address provided in the sender's certificate is accessed utilizing only one or more of a certificate holder's first name, last name, or e-mail address.

6. A method for secure message processing by a communication device to identify an email impersonation attack, the method comprising:
receiving a secure electronic message from a sender, the secure electronic message including a header, contents, and a signature of the sender, the signature comprising a message hash encrypted with a private key of the sender, the header including a sender's address;
checking local memory of the communication device for a public key of the sender;
querying a certificate server over a wireless network to retrieve the public key when the public key was not found in the local memory and to retrieve a corresponding certificate, the querying including providing one or more parameters from the header of the secure electronic message to the certificate server to identify the sender, the certificate being a public key certificate;
authenticating the public key and the corresponding certificate by comparing the sender's address provided in the header of the secure electronic message with the sender's address provided in the certificate, the certificate being a public key certificate of the sender;
when the certificate is authenticated, checking the authenticity of the secure electronic message using the sender's public key and displaying the contents of the message when the secure electronic message is authenticated;
when the certificate fails to authenticate, providing a notification to a message recipient that the sender's address from in the secure electronic message does not match the sender's address provided in the certificate indicating a possible email impersonation attack in which the sender may have used a forged public key; and
determining a status of the certificate by checking a certificate revocation list (CRL);
when the certificate has not been revoked, authenticating the certificate, and when the certificate has been revoked, refraining from authenticating the certificate.

7. The method of claim 6, wherein when the certificate is authenticated, the method includes:
checking the authenticity of the secure electronic message by extracting the signature from the secure electronic message and decrypting the signature using the sender's public key to determine a decrypted message hash;
generating a new hash code from the message;
comparing the new hash code with the decrypted message hash; and
displaying the contents of the message if the new hash code matches the decrypted message hash.

8. The method of claim 7, wherein the signature is a digital signature in an S/MIME format or a PGP format.

9. The method of claim 8, wherein the certificate server is implemented as a Lightweight Directory Access Protocol (LDAP) server or as an Online Certificate Status Protocol (OCSP) server.

10. A system embodied on a non-transitory computer readable storage medium for enabling electronic mail message processing by a communication device to identify an email impersonation attack, comprising instructions code configured to:
receive a secure electronic message from a sender, the secure electronic message including a header, contents, and a signature of the sender, the signature comprising a message hash encrypted with a private key of the sender, the header including a sender's address;
check local memory of the communication device for a public key of the sender;
query a certificate server over a wireless network to retrieve the public key when the public key was not found in the local memory and retrieve a corresponding certificate, the querying including providing one or more parameters from the header of the secure electronic message to the certificate server to identify the sender, the certificate being a public key certificate;
authenticate the public key and the corresponding certificate by comparing the sender's address provided in the header of the secure electronic message with the sender's address provided in the certificate; and
when the certificate is authenticated, check the authenticity of the secure electronic message using the sender's public key and to display the contents of the message when the secure electronic message is authenticated; and
when the certificate fails to authenticate, provide a notification to a message recipient that the sender's address from in the secure electronic message does not match the sender's address provided in the sender's certificate indicating a possible email impersonation attack in which the sender may have used a forged public key.

11. The system of claim 10, wherein the instructions further configure the communication device to provide the message recipient with information regarding whether the sender's address provided in the secure electronic message is indicative of the sender's address provided in the sender's certificate, wherein the information is provided to the message recipient if a visual indication is activated on a message recipient device.

12. The system of claim 10, wherein when the certificate is authenticated, the instructions further configure the communication device to:
check the authenticity of the secure electronic message by extracting the signature from the secure electronic message and decrypting the signature using the sender's public key to determine a decrypted message hash;

generate a new hash code from the message;
compare the new hash code with the decrypted message hash; and
display the contents of the message if the new hash code matches the decrypted message hash.

13. A non-transitory computer readable storage medium that stores instructions for enabling electronic mail message processing by a communication device to identify an email impersonation attack, wherein the instructions configure the communication device to:
receive a secure electronic message from a sender, the secure electronic message including a header, contents, and a signature of the sender, the signature comprising a message hash encrypted with a private key of the sender, the header including a sender's address;
check local memory of the communication device for a public key of the sender;
query a certificate server over a wireless network to retrieve the public key when the public key was not found in the local memory and retrieve a corresponding certificate, the querying including providing one or more parameters from the header of the secure electronic message to the certificate server to identify the sender, the certificate being a public key certificate;
authenticate the public key and the corresponding certificate by comparing the sender's address provided in the header of the secure electronic message with the sender's address provided in the certificate;
when the certificate is authenticated, check the authenticity of the secure electronic message using the sender's public key and to display the contents of the message when the secure electronic message is authenticated;
when the certificate fails to authenticate, provide a notification to a message recipient that the sender's address from in the secure electronic message does not match the sender's address provided in the certificate indicating a possible email impersonation attack in which the sender may have used a forged public key; retrieve the certificate from one or more of the local memory and the certificate server;
determine a status of the certificate by checking a certificate revocation list (CRL);
when the certificate has not been revoked, authenticate the certificate, and
when the certificate has been revoked, refrain from authenticating the certificate.

14. A communication device configured for secure message processing to identify an email impersonation attack, the communication device comprising a processor, local memory and a display, wherein the processor is configured for:
receiving a secure electronic message from a sender, the secure electronic message including a header, contents, and a signature of the sender, the signature comprising a message hash encrypted with a private key of the sender, the header including a sender's address;
checking the local memory of the communication device for a public key of the sender;
querying a certificate server over a wireless network to retrieve the public key when the public key was not found in the local memory and to retrieve a corresponding certificate, the querying including providing one or more parameters from the header of the secure electronic message to the certificate server to identify the sender, the certificate being a public key certificate;
authenticating the public key and the corresponding certificate by comparing the sender's address provided in the header of the secure electronic message with the sender's address provided in the certificate; and
checking the authenticity of the secure electronic message using the sender's public key when the certificate is authenticated;
wherein the display is configured for displaying the contents of the message when the secure electronic message is authenticated and for providing a notification to a message recipient when the certificate fails to authenticate that the sender's address from in the secure electronic message does not match the sender's address provided in the sender's certificate indicating a possible email impersonation attack in which the sender may have used a forged public key.

* * * * *